United States Patent
Priban

(10) Patent No.: US 6,614,906 B1
(45) Date of Patent: Sep. 2, 2003

(54) TELEPHONE TO COMPUTER AUDIO INTERFACE

(76) Inventor: Robert J. Priban, 214 White Oak Dr., North Aurora, IL (US) 60542

( * ) Notice: Subject to any disclaimer, the term of this patent is extended or adjusted under 35 U.S.C. 154(b) by 0 days.

(21) Appl. No.: 09/156,286

(22) Filed: Sep. 17, 1998

(51) Int. Cl.[7] .............................................. H04M 1/00
(52) U.S. Cl. .............................. 379/387.01; 379/413.04
(58) Field of Search ........................ 379/387, 93, 394, 379/442, 99

(56) References Cited

U.S. PATENT DOCUMENTS

| | | | | |
|---|---|---|---|---|
| 4,740,955 A | * | 4/1988 | Litterer et al. ............... | 370/264 |
| 5,455,859 A | * | 10/1995 | Gutzmer ..................... | 379/442 |
| 5,625,679 A | * | 4/1997 | Gutzmer ..................... | 379/99 |
| 6,175,565 B1 | * | 1/2001 | McKinnon et al. ......... | 379/900 |

* cited by examiner

Primary Examiner—Forester W. Isen
Assistant Examiner—Jefferey Harold
(74) Attorney, Agent, or Firm—Welsh & Katz, Ltd.

(57) ABSTRACT

An audio interface for coupling a telephone handset and a telephone base unit to a computer is provided. The audio interface comprises a feed through circuit coupled between the telephone handset and the telephone base unit and a buffer circuit connected to the computer. The buffer circuit is coupled to the feed through circuit, in one example, by one or more transformers that perform a bi-directional conversion between balanced signals of the feed through circuit and single-ended signals of the buffer circuit. In one example, the feed through circuit comprises a microphone circuit and an earpiece circuit. In one example, the buffer circuit has an output of a first buffer connected to an audio input of the computer and an input of a second buffer connected to an audio output of the computer.

6 Claims, 2 Drawing Sheets

TELEPHONE TO COMPUTER AUDIO INTERFACE

BACKGROUND

The present invention relates to audio interfaces between a telephone set and a computer.

Telephones, and telephone networks, are useful for voice communications. Also, it is generally known that computers may be connected to telephone subscriber lines by a modem. Such a connection may be useful for data and facsimile communications. However, typical known modems are not useful for processing voice and/or other audio information during a voice conversation conducted using a conventional telephone. What is needed is a telephone to computer audio interface capable of combining audio signals from the telephone with audio signals from the computer.

SUMMARY

Accordingly, an audio interface for coupling a telephone handset and a telephone base unit to a computer is provided. The audio interface comprises a feed through circuit coupled between the telephone handset and the telephone base unit and a buffer circuit connected to the computer. The buffer circuit is coupled to the feed through circuit, in one example, by one or more transformers that perform a bidirectional conversion between balanced signals of the feed through circuit and single-ended signals of the buffer circuit. In one example, the feed through circuit comprises a microphone circuit and an earpiece circuit. In one example, the buffer circuit has an output of a first buffer connected to an audio input of the computer and an input of a second buffer connected to an audio output of the computer.

DETAILED DESCRIPTION

Figure 1:
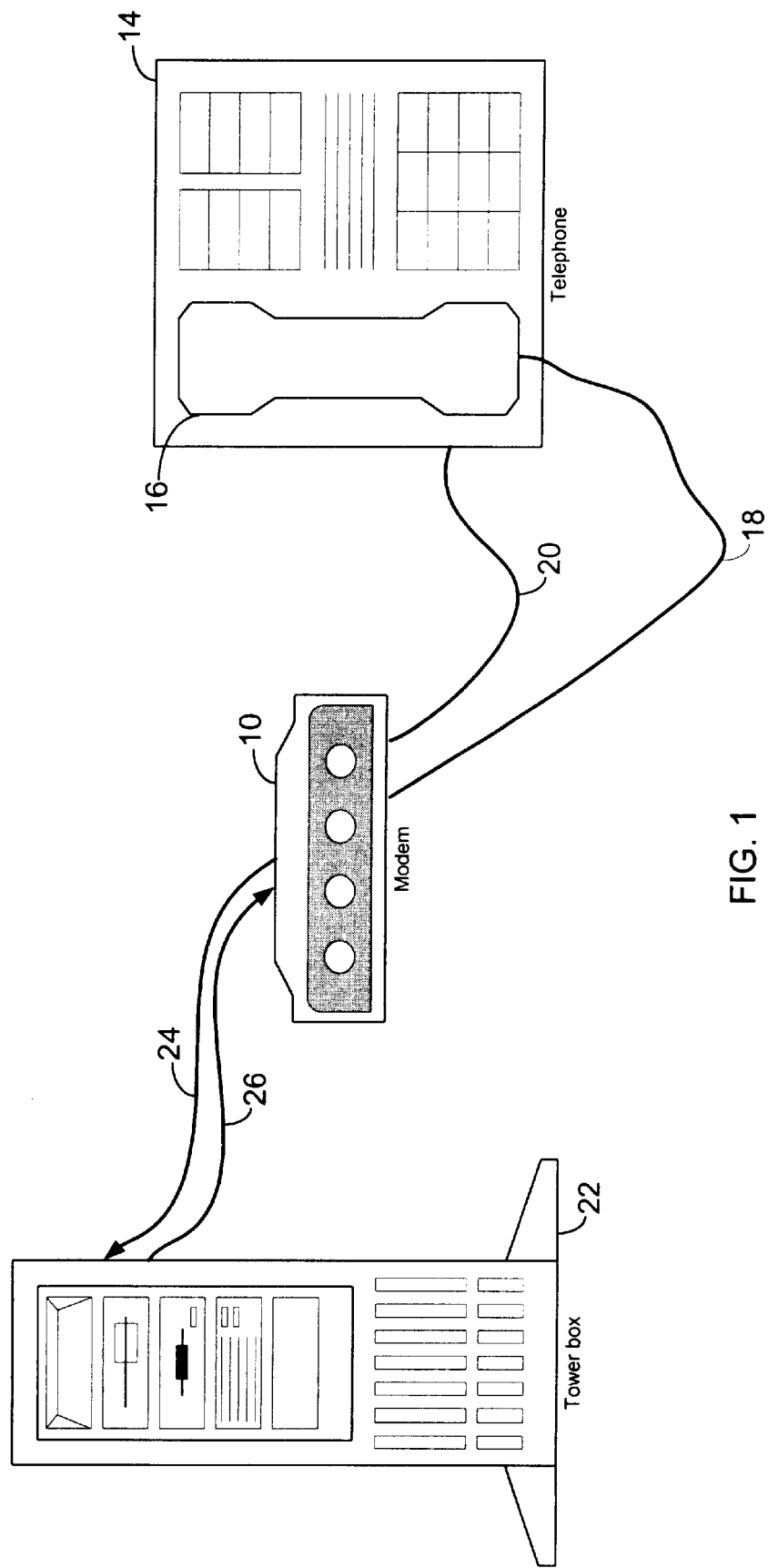
FIG. 1 is an illustration of one example of how the audio interface of the present invention connects between a computer and a telephone.

FIG. 1 illustrates one example of the inventive concept. A telephone 12, having a base unit 14 and a handset 16, is connected to an audio interface 10 via handset line 18 and base unit line 20, respectively. The audio interface 10 is connected to a computer 22 via interface lines 24 and 26. The computer 22 may be a special-purpose computer or a general purpose computer, such as a "personal computer." Interface lines 24 and 26 are connected to a conventional audio card (not illustrated) on the computer 22.

Figure 2:
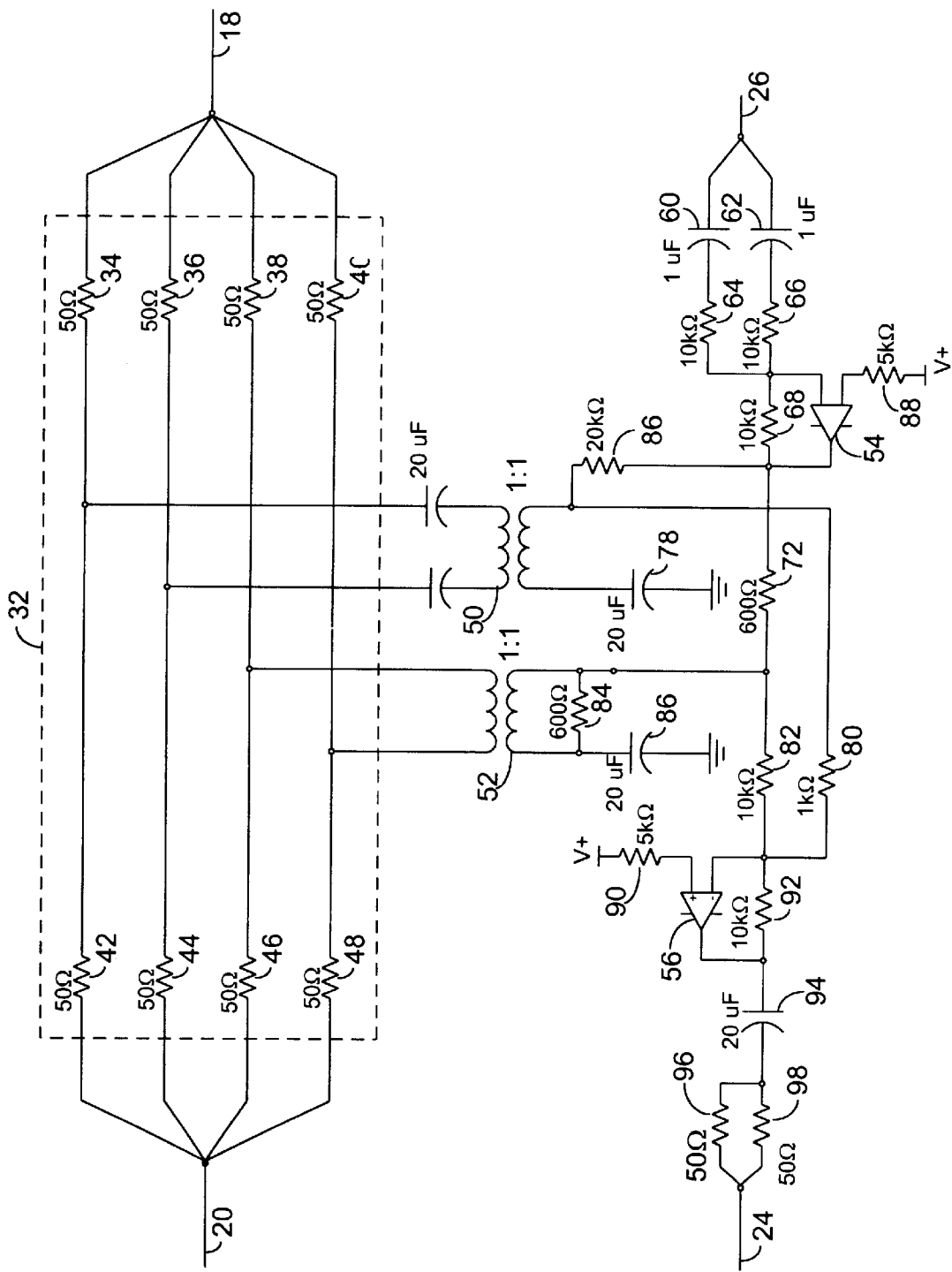
FIG. 2 is a schematic illustration of one example of an audio interface of the present invention.

One example of the audio interface 10 is shown in FIG. 2. The example of FIG. 2 pertains to a conventional four-wire handset interface. Two wires correspond to a microphone circuit for the handset 16, and two wires correspond to an earpiece circuit for the handset 16. The earpiece and microphone circuits of the handset 16 are not independently illustrated.

The examples of the audio interface 10 illustrated in FIG. 2 includes a feed through circuit 32. The feed through circuit 32 couples the handset line 18 to base unit line 20 via pairs of resistors 34, 36, 38, 40, 42, 44, 46, and 48. 50 ohms is an acceptable value for the resistors of the feed through circuit 32. Resistors 34, 36, 42, and 44 feed-through the microphone circuit of the telephone 12, and resistors 38, 40, 46, and 48 feed-through the earphone circuit. Transformers 50 and 52 are connected to the feed through circuits between the pairs of resistors. Transformers 50 and 52 are configured to perform a bi-directional conversion between balanced microphone and earphone signals to single-ended signals. Buffers 54 and 56 buffer the transformed signals to and from the computer 22. Buffers 54 and 56 may comprise TL082—type operational amplifiers or any suitable buffer or amplifier.

The audio output signals from the computer are AC coupled to a first input of buffer 54 via capacitors 60 and 62 and resistors 64 and 66. Values of 1 $\mu$F for capacitors 60 and 62 and 10K ohms for resistors 64 and 66 are acceptable. A second input of buffer 54 is connected to supply voltage via 5K $\Omega$ resistor 88.

The gain of buffer 54 is configured through the use of feedback resistor 68. A value of 10K Q is acceptable for resistor 68. The output of buffer 54 is connected to a first pole of a first winding of transformer 50 through a 20K $\Omega$ resistor 70, and is connected to a first pole of a first winding of transformer 52 through a 600 $\Omega$ resistor 72. The second pole of the first winding of transformer 50 is AC coupled to ground via 20 $\mu$F capacitor 78. The second winding of transformer 50 is connected to the microphone circuit of feed through circuit 32.

The first pole of the first winding of transformer 50 is coupled to buffer 56 via 1K $\Omega$ resistor 80. The first pole of the first winding of transformer 52 is coupled to the first input of buffer 56 via 10K $\Omega$ resistor 82. The first pole of the first winding of transformer 52 is also coupled to the second pole of the first winding by 600 $\Omega$ resistor 84. The second pole of the first winding of transformer 52 is AC coupled to ground by capacitor 86. The second winding of transformer 52 is connected to the earphone circuit of feed-through circuit 32.

A second input of buffer 56 is connected to supply voltage via 5K $\Omega$ resistor 90. The output of buffer 56 is connected to the first input of buffer 56 through 10K $\Omega$ resistor 92. The output of buffer 56 is also AC coupled to line 24 via 20 $\mu$F capacitor 94 and 50 $\Omega$ resistors 96 and 98.

In operation, the computer 22 receives audio signals as follows. Balanced earpiece audio signals from the telephone base unit 14 are passed though the bypass circuit 32 to the earpiece of the handset 16. Transformer 52 is coupled to the bypass circuit, and converts the earpiece audio signal from balanced to single-ended, and passes the single-ended earpiece audio signal to buffer 56 via resistor 82. The single-ended earpiece audio signal is transmitted to an input audio channel of the computer 22 via buffer 56. The computer 22 inserts audio signals onto the telephone line as follows.

A single-ended audio signal is output by the audio card of the computer 22. The single-ended audio signal is buffered by buffer 54 and coupled to the microphone bypass circuit by transformer 50. In the illustrated example, the single-ended microphone signal is also coupled onto the earpiece bypass circuit by transformer 52.

The foregoing description is given for clarity of understanding of the invention. It is to be understood that various changes can be made to the illustrated embodiments described by one skilled in the art without departing from the scope or spirit of the invention and that the invention is not limited to the embodiments described. For example, the present invention is not intended to be limited to the component values for resistors, capacitors, or other electronic components of the illustrated example. Also, the present invention is not limited to being implemented in discrete components, and may be implemented in integrated circuits as well. It is therefore contemplated to cover all modifications, variations, or equivalents that fall within the scope of the appended claims.

What is claimed is:

1. An audio interface for coupling a telephone handset and a telephone base unit to a computer, comprising:

first means for feeding telephone handset signals through to the base unit; and second means for buffering audio signals to the computer; wherein the first means is coupled to the second means by a third means for converting balanced signals to single ended signals and for converting single ended signals to balanced signals.

2. The audio interface of claim 1, wherein the second means further comprises a fourth means for buffering audio signals to the computer and a fifth means for buffering audio signals from the computer.

3. An audio interface for coupling a telephone handset and a telephone base unit to a computer having an audio input and an audio output, comprising:

a feed through circuit coupled between the telephone handset and the telephone base unit; an audio buffer coupled between the computer and the feed through circuit, the audio buffer having an output of a first buffer connected to the audio input of the computer and an input of a second buffer connected to the audio output of the computer, and an output of the second buffer is connected to an input of the first buffer; and wherein the feed through circuit comprises a balanced signal circuit; the audio buffer comprises a single-ended circuit; and a coupler couples the balanced signal feed through circuit to the single-ended buffer circuit.

4. The audio interface of claim 3, wherein the audio input and audio output of the computer are continuously coupled to the feed through circuit via the audio buffer.

5. The audio interface of claim 3, wherein the audio input and audio output of the computer are continuously coupled to the telephone handset and a telephone base unit via the feed through circuit and the audio buffer.

6. An audio interface for coupling a telephone handset and a telephone base unit to a computer, comprising:

a feed through circuit coupling signals from the telephone handset through to the telephone base unit and coupling signals from the telephone base unit to the telephone handset; and an audio buffer coupling audio signals from the feed through circuit to the computer and from the computer to the feed through circuit;

wherein the feed through circuit is coupled to audio buffer by a balanced signal to single ended signal converter and by a single ended signal to balanced signal converter.

* * * * *